United States Patent [19]
Kawaoka

[11] Patent Number: 5,852,503
[45] Date of Patent: *Dec. 22, 1998

[54] SYSTEM FOR PRINTING FILM IMAGES FROM A ROLL OF FILM HAVING MIXED PRINT FORMATS

[75] Inventor: Yoshiki Kawaoka, Asaka, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 599,927

[22] Filed: Feb. 12, 1996

[30] Foreign Application Priority Data

Feb. 15, 1995 [JP] Japan .................................. 7-026721

[51] Int. Cl.⁶ ...................................................... G03B 27/52
[52] U.S. Cl. ............................................. 358/527; 358/528
[58] Field of Search ..................................... 358/527–528, 358/449–451; 355/55–59, 64; 399/308–311, 204

[56] References Cited

U.S. PATENT DOCUMENTS

| | | | |
|---|---|---|---|
| 4,482,924 | 11/1984 | Brownstein | 358/202 |
| 5,032,707 | 7/1991 | Gudmundson et al. | 235/375 |
| 5,313,283 | 5/1994 | Rice et al. | 358/350 |
| 5,371,562 | 12/1994 | Hahm et al. | 354/112 |
| 5,386,304 | 1/1995 | Suzuki | 358/458 |
| 5,440,401 | 8/1995 | Parulski et al. | 358/342 |
| 5,448,372 | 9/1995 | Axman et al. | 358/342 |
| 5,486,895 | 1/1996 | Leidig et al. | 355/50 |

FOREIGN PATENT DOCUMENTS

| | | |
|---|---|---|
| 4-11237 | 1/1992 | Japan . |
| 4-89934 | 8/1992 | Japan . |
| WO9004301 | 4/1990 | WIPO . |

*Primary Examiner*—Scott Rogers
*Assistant Examiner*—Stephen Brinich

[57] ABSTRACT

Developed photographic film is mounted in a scanner block, and then a film image is picked up. The picked-up film image is memorized in an image memory via a scanner I/F. At the same time, information relating a print format being recorded as magnetic information in the film is read by a magnetic regenerating part. A CPU instructs a print control block to feed a sheet of print paper corresponding to the print format of each frame from the information relating a print format, and selects a paper tray containing the desired print paper among a plurality of paper trays so as to make a printing part feed the print paper. The printing part makes a print of the frame image being memorized in the image memory.

14 Claims, 3 Drawing Sheets

SYSTEM FOR PRINTING FILM IMAGES FROM A ROLL OF FILM HAVING MIXED PRINT FORMATS

BACKGROUND OF THE INVENTION

1. Field of the Invention

The present invention relates to an apparatus and a method for printing film image and more particularly to a film image printing apparatus capable of controlling a supply of print paper in accordance with a print format corresponding to each of film images of a photographic film.

2. Description of the Related Art

There is a proposed camera which uses photographic film including a magnetic layer, and which is capable of writing and reading information such as a photographing date, photographing condition and the like in and from the photographic film by a magnetic head at the time of photographing (Japanese Utility Model Application Laid-open No. 4-89934, Japanese Patent Application Laid-open No. 411237, W090/4301).

After the photographic film is developed, the information recorded in the magnetic layer is used for picking up an image on a frame of the film by an image sensor, for regenerating the image on the TV monitor, and for making prints on the occasion of film processing.

Also, another printing apparatus is proposed. In this apparatus, an image of the film is picked up by an image sensing device such as a CCD, etc. and an image signal is generated and applied to a printer, so that the image can be printed.

There are now many kinds of print format. For example, a large size (L size), a high vision size (H size), a panoramic size (P size), and the like are given, and aspect ratios of the formats are different from each other. The print papers of different aspect ratios are used in accordance with the print formats.

However, in the case when the conventional printing apparatus uses a roll of film in which a plurality of prints formats exist with mixed the appropriate print paper should be manually selected every time the print format changes, or a tray for the print paper should be exchanged for the tray which houses a print paper corresponding to a present print format. As a result, there is problem in that the operation is complicated.

SUMMARY OF THE INVENTION

The present invention has been developed in view of the above-described circumstances, and has an object to provide an apparatus and a method for printing film image capable of automatically controlling a supply of print paper used for printing in accordance with a print format being instructed for each frame, and capable of full-automatically printing the film image even if a plurality of mixed print formats exist within a roll of film.

To achieve the above-mentioned objects, a film image printing apparatus of the present invention includes print format detecting means, image reading means, printing means, print paper selecting means and print paper supply means.

The print format detecting means detects print format information which indicates a print format of the image such as a half size print, a high vision size print, a panoramic size print and the like. The print format information is either magnetic information which is recorded in a magnetic layer provided for each frame of the film or optical information which is recorded in the film in such manner to correspond to each frame. The image reading means reads the image on the frame of photographic film. The printing means makes a print of the image read by the image reading means. The print paper selecting means selects print paper corresponding to the print format of the image to be printed in accordance with the print format information detected by the print format detecting means. The print paper supply means supplies a sheet of print paper which is selected by the print paper selecting means to the printing means at the time of making print for the image.

According to the present invention, the print paper corresponding to the print format of each image is selected in accordance with the print format information which is recorded in the film. Therefore, even if the film image printing apparatus uses a roll of film in which a plurality of prints with mixed formats exists, the appropriate print paper can be automatically selected every time the print format changes. As a result, it is not required to manually select the print paper or to exchange a tray with the tray which houses a print paper corresponding to a present print format.

Furthermore, instead of the provision of the print paper selecting means and print paper supply means, it is possible to provide feed length determining means, print paper feeding means and cutting means. In this case, a roll of print paper is used as the print paper. The feed length determining means determines a feed length of a roll of print paper corresponding to the print format in accordance with the print format information detected by the print format reading means. The print paper feeding means feeds the roll of print paper to the printing means by a feed length which is determined by the feed length determining means. The cutting means cuts the print paper after printing.

Furthermore, according to the present invention, a film image printing method for making a print of an image on a frame of a roll of developed photographic film comprises the steps of reading the image of the photographic film, detecting print format information indicating a print format of the image, which print format information is recorded in the photographic film, determining a size of print paper for the image to be printed in accordance with the detected print format information, supplying print paper in accordance with the determined size, and printing the read image on the supplied print paper.

BRIEF DESCRIPTION OF THE DRAWINGS

The exact nature of this invention, as well as other objects and advantages thereof, will be readily apparent from consideration of the following specification relating to the accompany drawings, in which like reference characters designate the same or similar parts throughout the figures thereof and wherein.

DESCRIPTION OF THE PREFERRED EMBODIMENT

Detailed description will hereunder be given of the preferred embodiment of a film image printing apparatus according to the present invention with reference to the accompanying drawings.

Figure 1:
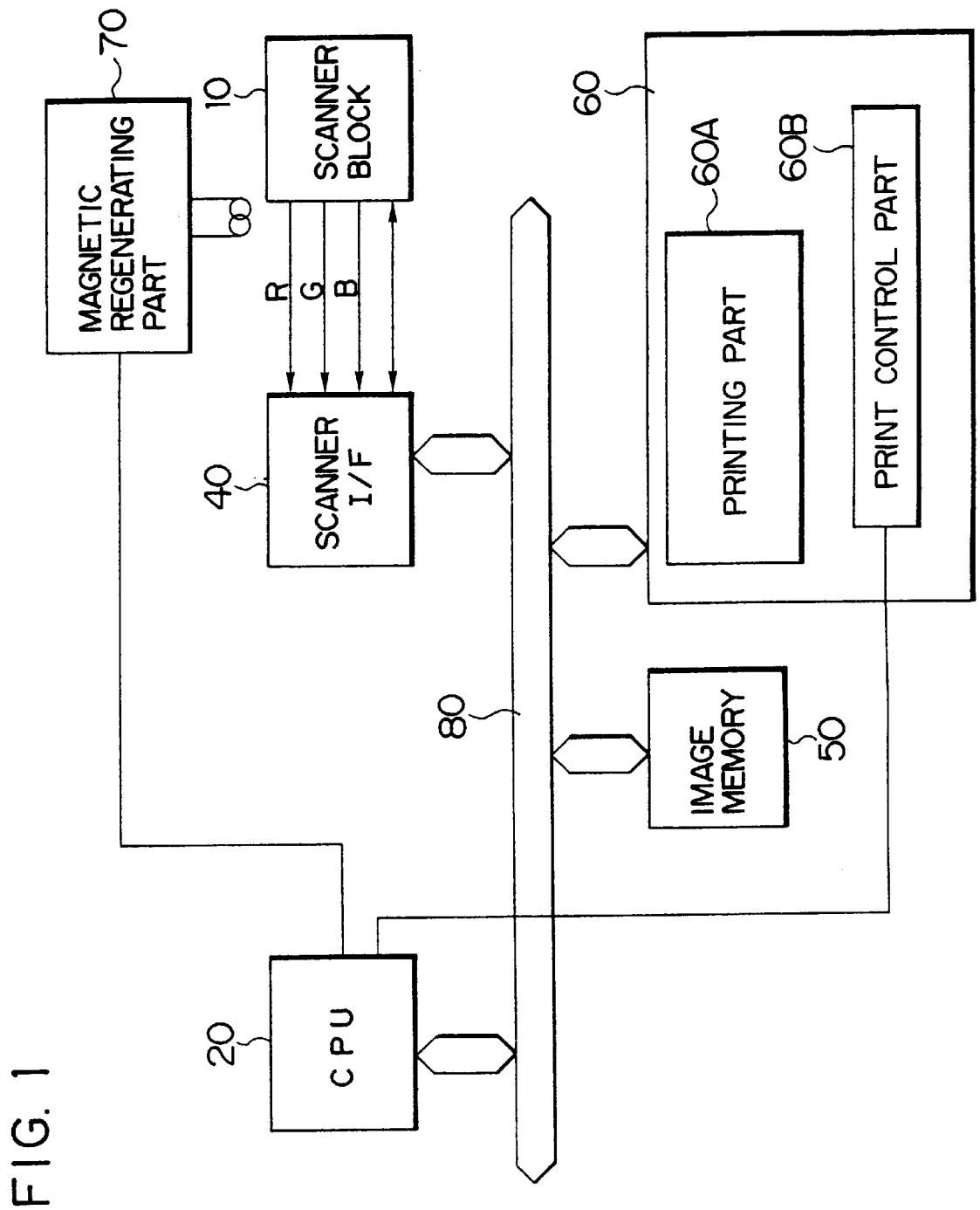
FIG. 1 is a block diagram illustrating one embodiment of a film image printing apparatus according to the present invention.

FIG. 1 is a block diagram illustrating the first embodiment of a film image printing apparatus according to the present invention. The film image printing apparatus mainly comprises a scanner block 10, a central processing unit (CPU) 20, an image memory 50, a printer block 60, a magnetic regenerating part 70, and so forth.

First, an explanation will hereunder be given of the scanner block 10.

Figure 2:
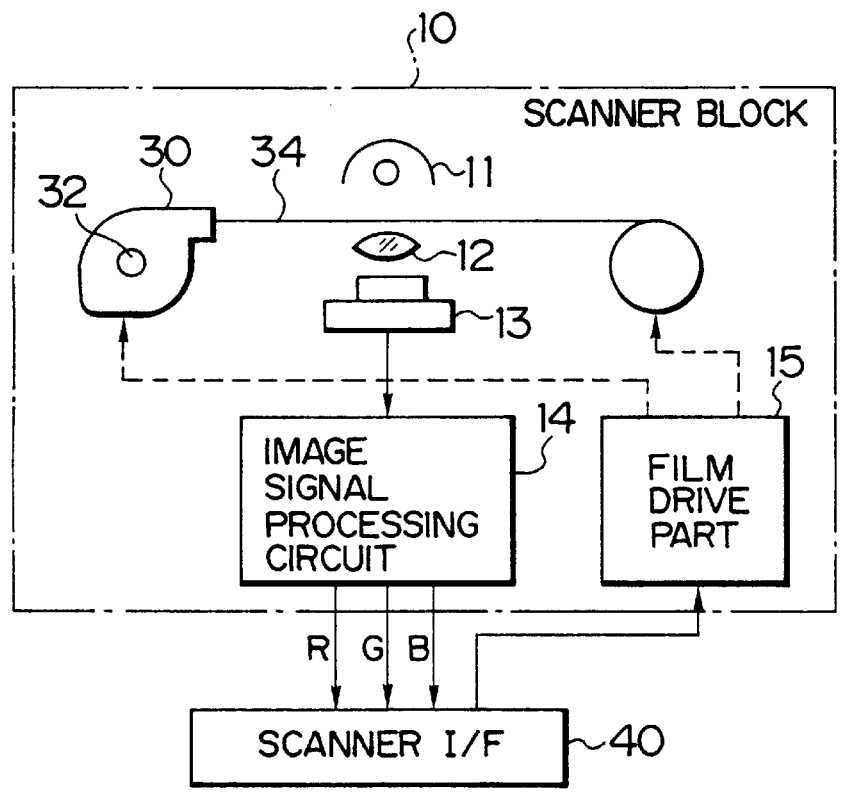
FIG. 2 is a block diagram illustrating details of a scanner block shown in FIG. 1.

As shown in FIG. 2, the scanner block 10 includes a light source 11 for illumination, a taking lens 12, a CCD line sensor 13, an image signal processing circuit 14, a film drive part 15, a cartridge storage part (not shown in the drawing) for storing a film cartridge 30, and so forth.

Figure 3:
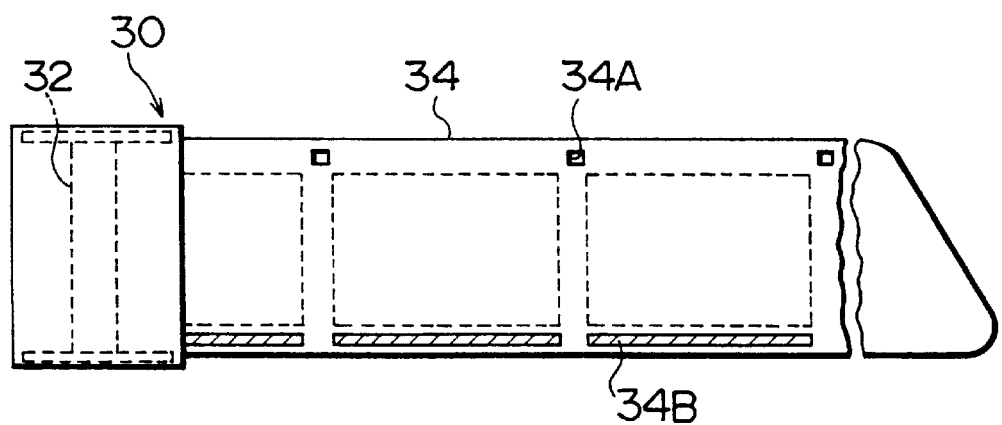
FIG. 3 is a view illustrating one example of a film cartridge shown in FIG. 2.
Figure 4:
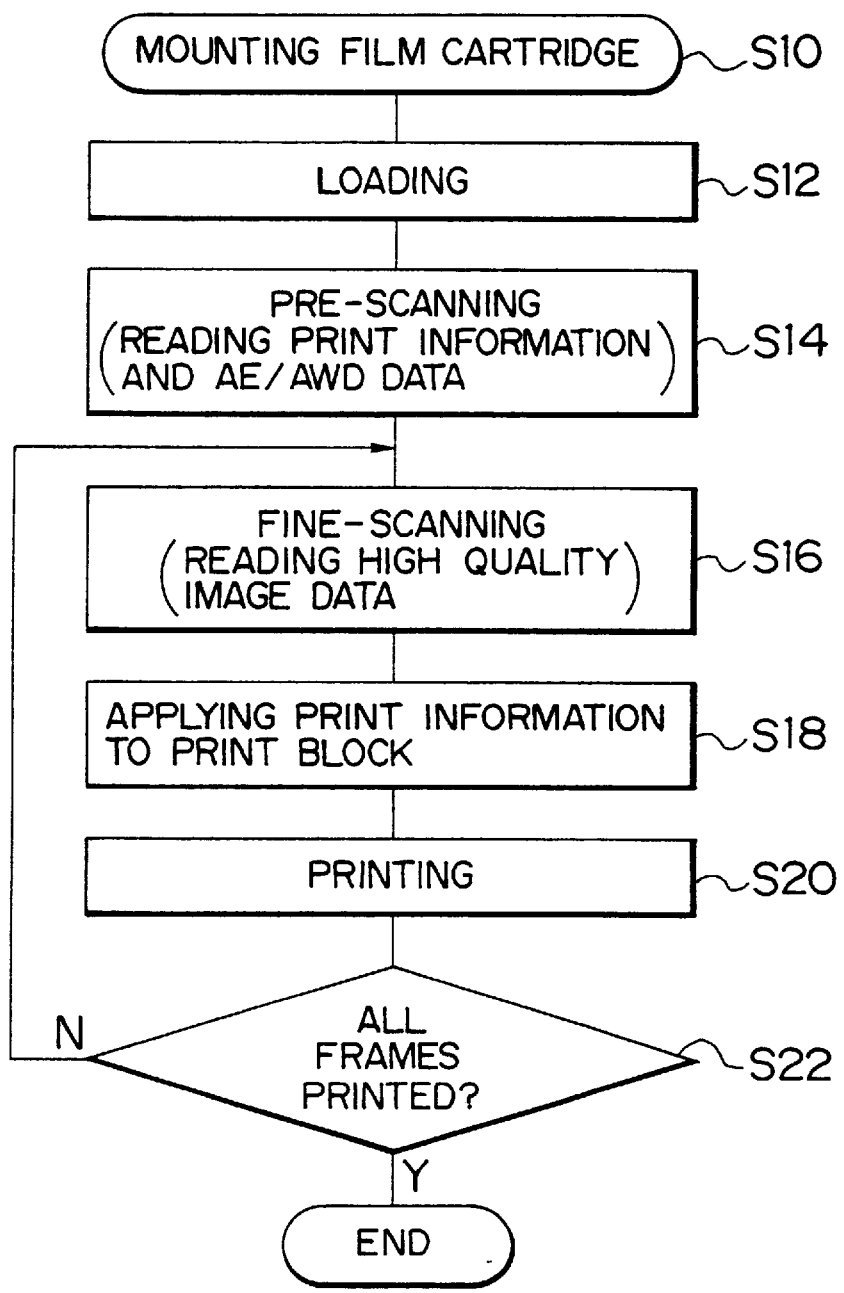
FIG. 4 is a flow chart illustrating operations of a film image printing apparatus shown in FIG. 1.

The film cartridge 30 has a single spool 32 as shown in FIG. 3, and a developed photographic film 34 is wound around the spool 32. A perforation 34A is provided beside each of the frames of the film 34 in order to indicate a position of each frame. A magnetic layer 34B is formed on the whole surface or on the edge of the film. Magnetic data recorded in the magnetic layer 34B can be regenerated by a magnetic head of the magnetic regenerating part 70.

Information indicating a print format for each frame (size H, L and P) is recorded in the magnetic layer 34B, and this information is used for making prints on the occasion of film processing. Incidentally, it is also possible to optically record the information relating to the print format as optical information such as a bar code at the time of photographing. In this case, the print format is read out by a bar code reader. Moreover, it is also possible to record print information relating to the number of prints, zooming, trimming, color correction, size of prints, letters, decorations, layout arrangement, etc. in the magnetic layer by means of a film player and the like after the film is developed. Various printing can be carried out based on the above-mentioned print information.

The film 34 is illuminated by a light source 11 and an image light is formed on a light-accepting surface of the CCD line sensor 13 through the taking lens 12. Then, the image light formed on the light-accepting surface is electrically charged in each sensor having one of R, G and B filters for a predetermined time to be converted into signal electric charge corresponding to the light strength. The signal electric charge is sent to a shift register by means of a lead gate pulse of a predetermined cycle which is applied by a CCD drive circuit (not shown in the drawing), and is sequentially read out from the CCD line sensor 13 as image signals by a register transfer pulse.

After a predetermined signal processing is carried out for the read-out image signal by the image signal processing circuit 14, the image signal is memorized in the image memory 50 (see FIG. 1) via a scanner interface (a scanner I/F) 40 and a bus line 80.

The film drive part 15 includes a film supply part which is engaged with the spool 32 of the film cartridge 30 and drives the spool 32 forward and backward, a film wind-up part which winds up the film 34 sent out from the film supply part, and the like. The film drive part 15 can send the film 34 continuously or one frame by one while appropriately changing a transport speed in accordance with various kinds of film drive instructions which are applied by the scanner 1/F 40. When the film cartridge 30 is mounted in the scanner block 10, the film supply part rotates the spool 32 of the film cartridge 30 clockwise in FIG. 2, and sends out the forward end of the film from the film cartridge 30.

Incidentally, the CCD line sensor 13 has a sensor of, for example, 2048 picture elements in a direction perpendicular to a film transport direction. Moreover, the number of picture elements in the same direction as the film transport direction for one frame (a direction of sub-scanning) is changed in accordance with a film feed speed if a cycle of the lead gate pulse, etc. of the CCD drive circuit is not changed. The greatest number of picture elements, which can be picked up, is 4000. That is, the greatest number of picture elements in one frame is 2K X 4K.

The print block 60 of FIG. 1 is composed of a printing part 60A and a print control part 60B. The printing part 60A makes prints on a print paper on the basis of the image data of the film which is applied from the image memory 50. A plural kinds of trays for print paper are provided with the printing part 60A, and the print papers corresponding to each of the print formats (size L, H and P) are respectively set in the trays. The print control part 60B selects an appropriate tray and supplies the print paper to the printing part 60A in accordance with a control signal from the CPU 20.

The CPU 20 unifies and controls each of blocks via the bus line 80. It also makes the magnetic regeneration part 70 regenerate the magnetic information from the magnetic layer of the film and makes the magnetic regeneration part 70 read out the print information from the magnetic layer 34B corresponding to each frame. The CPU 20 detects the print format of each frame (size L, H and P) from the print information, and gives an instruction of a kind of paper to be printed to the print control part 60B, so that an appropriate paper can be supplied to the printing part 60A.

An explanation will hereunder be given of a processing in the CPU 20.

First, when the film cartridge 30 is set in the scanner block 10 (Step S10), the CPU 20 controls the film drive part 15 (see FIG. 2), which carries out a film-loading (Step S12). When the film-loading is completed, a pre-scanning of the film 34 is carried out (Step S14). That is, AE/AWB data for each frame is obtained from the image data while the film 34 is continuously transported at a high speed, and the magnetic data is read out from the magnetic layer of the film 34 by the magnetic head of the magnetic regenerating part 70.

Next, the CPU detects a frame which is to be printed from the magnetic data (the print information), and carries out a fine-scanning of the frame to be printed (Step S16). However, when the information relating to the number of prints is not included in the print information, the fine scanning is carried out from the first frame (for example, there may be a case that only the information relating to the print format is recorded at the time of making prints on the occasion of film processing). That is, the frame to be printed is fed by one frame at a low speed, and the image data of one frame which has a high resolution is read out, and then the readout image data is memorized in the image memory 50. Incidentally, in the above-mentioned fine scanning, the image is processed while using the AE/AWB data which is detected at the pre-scanning, and the image is picked up in accordance with the print information. For example, when it is judged from a picture element size of print output that it is ideal to start processing in a ½ line of the greatest number of lines, a film feed speed is doubled to shorten a scanning time.

An image processing is performed for the image data of one frame having a high resolution which is stored in the image memory 50 in accordance with the print information, and the processed image data is transferred to the printing part 60A.

The CPU 20 detects a print format for the above-mentioned frame from the magnetic data (the print information), and transmits the information instructing the print paper corresponding to the print format to the print control part 60B (Step S18).

As a result, a print paper corresponding to the print format is supplied with the printing part 60, so that the print for the image of frame is made (Step S20).

When the printing of one frame is completed in the printing part 60A, the fine-scanning is carried out for a frame to be printed next. The image data of a high resolution being newly read out in this fine-scanning is written in the image memory 50, and the image data of a frame having already been printed is deleted.

Then, the printing part 60A makes prints for the next frame image for which a predetermined image editing has been performed.

As mentioned above, the fine scanning for each frame and the printing of the printing part 60A are alternately repeated, so that the frame image is sequentially printed.

In this embodiment, the print papers are prepared for each of for sizes L, H and P are stored in trays for each of sizes L, H and P. However, the present invention is not limited to this. For example, it is possible to supply the paper to the printing part from one roll of print paper regardless of the print type. In this case, the print paper is appropriately cut after the paper is fed by a length corresponding to each print format. Incidentally, a length of one side of print is the same regardless of the size L, H and P.

As has been described above, according to the film image printing apparatus of the present invention, the print format of each frame is judged in accordance with the print information which is recorded in the film, so that the supply of the print papers to be used for printing can be controlled. Therefore, even if a plurality of print formats exists with mixed within a roll of film, the prints can be easily made.

It should be understand, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film image printing apparatus comprising:

a printer:

film image reading means for reading a frame image from a roll of photographic film and outputting image data corresponding to the read frame image, the photographic film being coated with a magnetic recording layer and having preset photograph areas, the film storing a plurality of frame images which are respectively recorded on the whole area of each preset photograph area, each of the plurality of frame images having corresponding print format information indicating an aspect ratio of the corresponding frame image, said print information being recorded on said magnetic layer as rewritable magnetic information;

image memory for storing the image data corresponding to the read frame image output by said film image reading means;

print format information reading means for reading the print format information from the magnetic recording layer on the photographic film corresponding to the read frame image;

print paper selecting means for selecting a print paper type having an aspect ratio corresponding to the read print format information from among a plurality of print paper types having different aspect ratios;

print paper supply means for supplying the selected print paper type to said printer; and image processing means for reading out the image data from said image memory and processing the read out image data in accordance with the rad print format information so that the resulting image data is consistent with the print paper supplied to said printer, said printer printing the processed image data onto the supplied print paper.

2. The film image printing apparatus according to claim 1, wherein the print format information indicates one of a large size print, a high vision size print and a panoramic size print.

3. A film image printing apparatus comprising:

film image reading means for reading a frame image from a roll of photographic film and outputting image data corresponding to the read frame image, the photographic film being coated with a magnetic recording layer and having preset photograph areas, the film storing a plurality of frame images which are respectively recorded on the whole area of each preset photograph area, each of the plurality of frame images having corresponding print format information indicating the aspect ratio of the corresponding image frame, said print information being recorded on said magnetic recording layer as rewritable magnetic information;

image memory for storing the image data output by said film image reading means;

print format information reading means for reading print format information from the magnetic recording layer on the photographic film corresponding to the read frame image;

print paper feed length determining means for determining a feed length of a roll of print paper in accordance with the aspect ratio indicated by the read print format information;

print paper supply means for supplying print paper at a length determined by said print paper feed length determining means and cutting the print paper accordingly;

image processing means for reading out the image data from said image memory and processing the image data in accordance with the read print format information so that the resulting image is consistent with the supplied paper length; and a printer for printing the processed image data onto print paper supplied by said print paper supply means.

4. The print image printing apparatus according to claim 3, wherein the print format information indicates one of a large size print, a high vision size print and a panoramic size print, the print format information being recorded as magnetic information or optical information for each frame on the photographic film.

5. A film image printing apparatus comprising:

a printer;

film image reading means for reading a frame image from a roll of photographic film and outputting image data corresponding to the read frame image, the photographic film being coated with a magnetic recording layer and having preset photograph areas, the film storing a plurality of frame images which are respectively recorded on the whole area of each preset photograph area, each of the plurality of frame images having corresponding print format information indicating an aspect ratio of the corresponding frame image, said print information being recorded on said magnetic recording layer as rewritable magnetic information; image memory for storing the image data output by said image reading means;

print format, information reading means for reading print format information from the magnetic recording layer on the photographic film corresponding to the read frame image;

print paper supply means for feeding a roll of print paper to said printer during printing and cutting the print paper after printing; and image processing means for reading out the image data from said image memory and processing the image data in accordance with the read print format information so that a length of the image to be printed onto the print paper is consistent with the read print format information, said printer printing the processed image data onto print paper supplied by said print paper supply means.

6. The film image printing apparatus according to claim 5, wherein the print format information indicates one of a large size print, a high vision size print and a panoramic size print, the print format information being recorded as magnetic information or optical information for each frame on the photographic film.

7. A film image output apparatus comprising:

film image reading means for reading a frame image from a roll of photographic film and outputting image data corresponding to the read frame image, the photographic film being coated with a magnetic recording layer and having preset photograph areas, the film storing a plurality of frame images which are respectively recorded on the whole area of each preset photograph area, each of the plurality of frame images having corresponding print format information indicating an aspect ratio of the corresponding frame image, said print information being recorded on said magnetic recording layer as rewritable magnetic information;

image memory for storing the image data output by said image reading means;

print format information reading means for reading the print format information from the magnetic recording layer on the photographic film corresponding to the read frame image; and image processing means for reading out the image data from said image memory and processing the image data in accordance with the read print format information to obtain a print image having an aspect ratio corresponding to the read print format information, and outputting the resulting image data to a printer.

8. The film image output apparatus according to claim 7, wherein the print format information indicates one of a large size print, a high vision size print and a panoramic size print, the print format information being recorded as magnetic information or optical information for each frame on the photographic film.

9. The film image output apparatus according to claim 7, wherein said image processing means outputs image data and either information selecting a print paper type having an aspect ratio corresponding to the read print format information or information indicating a feed length of a roll of print paper.

10. A film image printing method comprising the steps of:

reading a frame image from a roll of photographic film and outputting image data corresponding to the read frame image, the photographic film being coated with a magnetic recording layer and having preset photograph areas, the film storing a plurality of frame images which are respectively recorded on the whole area of each preset photograph area, each of the plurality of frame images having corresponding print format information indicating an aspect ratio of the corresponding frame image, said print information being recorded on said magnetic recording layer as rewritable magnetic information;

storing the image data corresponding to the read frame image;

reading the print formation information from the magnetic recording layer on the photographic film corresponding to the read frame image;

selecting a print paper type having an aspect ratio corresponding to the read print format information;

reading out the stored image data and processing the read out image data in accordance with the read print format information so that the resulting image data is consistent with the selected print type; and printing the resulting image data onto the selected print paper type.

11. A film image printing method comprising the steps of:

reading a frame image from a roll of photographic film and outputting image data corresponding to the read frame image, the photographic film being coated with a magnetic recording layer and having preset photograph areas, the film storing a plurality of frame images which are respectively recorded on the whole area of each preset photograph area, each of the plurality of frame images having corresponding print format information indicating the aspect ratio of the corresponding frame image, said print information being recorded on said magnetic recording layer as rewritable magnetic information;

storing the image data corresponding to the read frame image in memory;

reading the print format information from the magnetic recording layer on the photographic film corresponding to the read frame image;

supplying a length of print paper from a print paper roll to obtain an aspect ratio indicated by the read print format information;

reading out the stored image data and processing the read out image data in accordance with the read print format information to obtain a print image having an aspect ratio corresponding to the rad print format information; and printing the resulting print image onto the supplied print paper.

12. The film image printing method according to claim 11, further comprising the step of:

cutting the print paper to the fed length.

13. A film image output method comprising the steps of:

reading a frame image from a roll of photographic film and outputting image data corresponding to the read frame image, the photographic film being coated with a magnetic recording layer and having preset photograph areas, the film storing a plurality of frame images which are respectively recorded on the whole area of each preset photograph area, each of the plurality of frame images having corresponding print format information indicating an aspect ratio of the corresponding image frame, said print information being recorded on said magnetic recording layer as rewritable magnetic information;

storing the image data corresponding to the read frame image in memory;

reading the print format information from the magnetic recording layer on the photographic film corresponding to the read frame image;

reading out the image data from memory and processing the read out image data in accordance with the read print format information to obtain a print image having an aspect ratio corresponding to the read print format information; and outputting the print image to a printer.

14. The film image output method according to claim 13 further comprising the step of:

outputting either information selecting a print paper type having an aspect ratio corresponding to the read print format information or information indicating a feed length of a roll of print paper corresponding to the read print format information.

* * * * *